Figure 1:
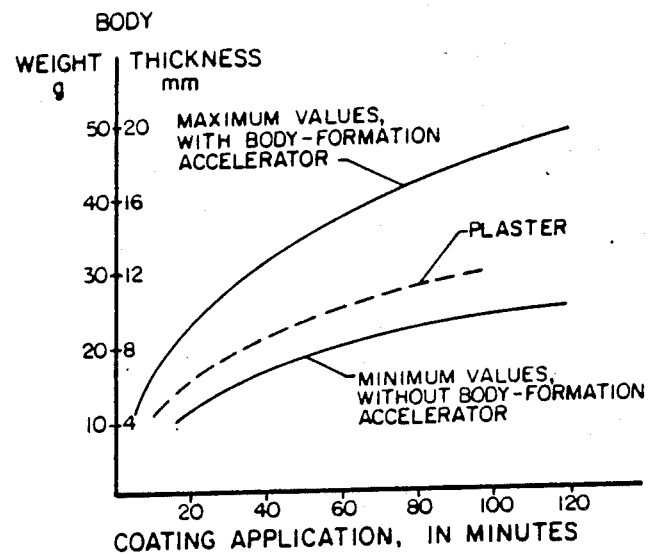

United States Patent [19]

Will

[11] Patent Number: 4,908,174
[45] Date of Patent: Mar. 13, 1990

[54] MOLDING OF CERAMIC MATERIALS

[76] Inventor: Guenther Will, Zimmerstrasse 11, 6100 Darmstadt, Fed. Rep. of Germany

[21] Appl. No.: 301,640

[22] Filed: Jan. 25, 1989

Related U.S. Application Data

[60] Division of Ser. No. 78,533, Jul. 28, 1987, Pat. No. 4,801,624, which is a division of Ser. No. 54,082, May 28, 1987, Pat. No. 4,727,092, which is a continuation of Ser. No. 764,851, Aug. 12, 1985, abandoned.

[30] Foreign Application Priority Data

Dec. 14, 1983 [DE] Fed. Rep. of Germany ....... 3345188
Mar. 14, 1984 [DE] Fed. Rep. of Germany ....... 3409278

[51] Int. Cl.⁴ .................. B28B 1/26; B29C 33/38
[52] U.S. Cl. .................................. 264/87; 264/219
[58] Field of Search ............. 264/86.87, 333, 219, 264/220, 224–227; 521/62, 63, 638

[56] References Cited

U.S. PATENT DOCUMENTS 4,489,174 1/1984 Karickhoff .................. 521/62

Primary Examiner—Jan H. Silbaugh
Assistant Examiner—Karen D. Kutach
Attorney, Agent, or Firm—Walter H. Schneider

[57] ABSTRACT

A porous, open pore, hardened, plastic composition suitable as a replacement for plaster for use as a mold in shaping a ceramic article by any of various ceramic shaping methods prepared by subjecting a water-in-oil emulsion to hardening, without breaking the emulsion, and then drying the hardened product, the emulsion having a viscosity of 1600–5000cP and/or containing 2–12% by weight of an alkali-reactive, water-binding material, the water phase/oil phase ratio providing an open pore volume in the composition equivalent to 10–60% of the total volume of the composition.

4 Claims, 1 Drawing Sheet

MOLDING OF CERAMIC MATERIALS

This application is a division of application Ser. No. 078,533 filed July 28, 1987, now U.S. Pat. No. 4,801,624, which is a division of application Ser. No. 054,082 filed May 28, 1987, now U.S. Pat. No. 4,727,092, which is a continuation of Ser. No. 764,851 filed Aug. 12, 1985, now abandoned.

For molding ceramic materials, plaster molds are used, to which varying quantities of water are added in order to produce molds for casting, turning or press molding. Depending on the stress put on them, on the pore volume, on the surface quality and on the type of use, the molds can be used from 50 to several hundred times. In addition to being an inexpensive material which is easily handled and versatile in its use as a mold for casting, turning or press molding, plaster has the advantageous property that when in contact with pourable ceramic compositions, it absorbs the water contained in the composition and thereby forms a body which requires approximately 1 to 30 minutes per mm of thickness and which separates from the form after further drying.

It is disadvantageous that the utility of plaster is limited, because of the limited number of times the mold can be used, and that the weight of the forms is heavy, which is a particular disadvantage in making large molded articles. A further disadvantage is that the still-plastic body often separates quickly from the mold. Possible replacements for plaster as a mold material have long been sought.

Only with die casting, in a method that has been known for about 20 years—the body is formed in a closed mold by using slip under high pressure—was it possible to dispense with using plaster as a mold material.

In order to produce die casting, turning and press molding molds, a number of methods of producing molds made of porous solid materials are known. For instance, water-soluble salts are admixed with hardenable resin molding compositions and after hardening of the composition, the salts are dissolved out again; or plasticizable plastics, such as polymethylmethacrylate or polyethylene, are pressed into a fine-grained form under the influence of heat, similarly to how porous cast metal parts are produced by sintering fine-grained powder. In other methods, the porosity is attained by pressing inorganic, fine-grained powders, such as quartz, with a small amount of resin added as a binder. Finally, the use of molding compositions made from porous calcium silicate hydrate, which is mixed with coarse-grained plastic and hardened in autoclaves, has also been described. These methods have the disadvantage that it is expensive and complicated to make the molds.

In German Patent 19 28 026, a method has been published which for producing porous solid materials recommends a hardenable, water-containing casting composition comprising fluid monomers that can be emulsified with water and polymers in powder form which are insoluble in water but which in the monomers are at least capable of swelling up; this composition is catalyzed and after being molded by casting is hardened. With the porous molds produced by this method, several thousand unmoldings, in die casting, became possible, with the slip at a pressure of 10 to 50 bar.

As indicated above, molds made by the known methods, especially when they were based on plastic, were heretofore suitable only to a very limited extent for molding ceramic materials. Pressureless production of a body from ceramic slip, which was typical for plaster, was impossible; it was not even considered attainable Thus up to the present time, plaster remained virtually the only mold material used for molding ceramic materials in the field of casting, turning and press molding.

The object of the invention is to make the molding of ceramic materials, which is substantially bound to the use of plaster, more economical, to reduce the considerable expense for materials, and to replace the plaster with a molding material that, like plaster, has body-forming properties, which is more resistant to stresses such as changes in moisture content and in temperature, pressure and frictional wear, and which facilitates shaping the mold itself. In so doing, a further object is that it be possible to use the same material as a mold for casting, turning, press molding and die casting, as well as to process plaster, in producing the working molds, in open or closed casting.

With the invention, further objects are that for casting processes, the waiting times while full and the drying time should also be shortened considerably; the number of successive, daily unmolding operations should be multiplied; it should be possible to regulate when the body is released from the mold; and the expense for energy and for molds should be reduced to a minimum.

A further variant of the method is intended to replace and simplify the previously used die casting method, in which elevated pressures of 10–50 bar are applied, by using a low-pressure method performed in accordance with the invention, so that the expense for molds and machinery becomes very low, and the mold waiting time becomes merely a fraction of that of conventional casting methods.

According to the invention, mold parts comprising porous plastics are produced from hardenable molding compositions containing water and are used for molding ceramic materials. These mold parts have an open pore volume, which is refillable with water, of at least 10% of the volume of the molding composition and have a capillary suction force, which when the mold wall is in contact with a fluid ceramic composition having a usual water content of approximately 25 to 35% by volume aspirates the suspended solids and solidifies them, whereby, as when plaster is used, a body is formed that can be released from the mold within a time range that is adjustable depending on the mold material.

The filled waiting time and the drying time of the molded article, and hence the mold waiting time, are shortened considerably according to the invention by incorporating additional compounds into the porous molding composition comprising the mold, and by accelerating body formation and water removal.

The speed with which a body is formed can be regulated to a desired time range via the quantity of body formation accelerating additives that the molding composition contains. Varying the body formation, when the molding composition according to the invention is used, with and without body formation accelerators, is shown in FIG. 1 as compared with plaster. The comparison in graph form, clearly shows the range of adjustment, and in particular the superiority attained with the body formation accelerator, that is attained with the invention. Because of the rapid dewatering, the filled waiting times and drying times can be reduced to from 33 to 20% of the times required in conventional casting using plaster molds.

An important component of the invention is the acceleration of the total mold waiting time. This is attained by placing the slip located in the form under pressure, for example by means of a suitable fill level or with the aid of compressed air. In contrast to the known die casting methods, in which pressures between 10 and 50 bar are required, it is sufficient in the novel low-pressure method to exert a pressure of 0.1 to approximately 5 bar, depending on the body thickness and filled waiting time desired, briefly upon the slip located in the mold.

With a slip intended for making bathroom fixtures, a body thickness of 4 to 8 mm is obtained within 5 to 10 minutes at a slip pressure of only 0.75 bar. The normal filled waiting time for these slips, in a plaster mold, is 65–75 minutes, and the mold waiting time is 230 minutes With the novel low-pressure method, mold waiting times between 12 and 15 minutes, for bodies of the same thickness, are attainable.

To this end, the casting molds can be equipped with slight modifications, such as closure devices for sealing the mold and a filling pipe, located above the level of the slip, that is provided with a closable air space for receiving the compressed air. The casting mold produced by the novel method should be adjusted to a pore volume between 30 and 60%. Casting molds of this kind can also be used as pressure molds.

In order to replace or augment the compressed air, the casting mold can be supported in a closed container and evacuated from outside.

The above-mentioned mold waiting times are applicable for stoneware or for slip used for ceramic bathroom fixtures, for example. In the case of porcelain slip, the filled waiting time and the mold waiting time are shortened considerably. The expenditures for the machine and the die casting mold required by known die casting methods are hardly comparable. By this method, not only solid and hollow casting, but combined hollow and solid casting is possible A further provision according to the invention for the molding of ceramic compositions has to do with regulating the release of the molded article from the plastic mold.

After repeated unmoldings, because of the increased water content retained in the mold, the plaster mold tends to release the molded article prematurely. This prevents the removal of moisture and increases the danger of shifting, especially of flat surfaces of the molded article. The plastic molds used in accordance with the invention tend instead to adhere to the molded article until dewatering is extensive. This can be accelerated by treating the body with warm air, and the instant of the release of the body from the mold can be adjusted by means of temperature and interaction time. However, since this is associated with possibly uneven drying beginning at the air-treated side, attempts were made to accelerate the release of the body. While the usual methods using lubricants such as talc, stearates and others, caused deposits to form and caused delayed body formation, a provision according to the invention brought about an optimal result. Before the slip is introduced into the mold, it is briefly sprayed with a plaster spray. For doing so, the dihydrate is used in a 1 to 10% suspension. The body forming time is not changed in any way thereby, and the very slight traces of plaster remaining on the molded article have no effect on its later processing. If necessary, a small amount of lubricant can be added to the mold separating spray.

Deposits and residues on the mold can be removed readily using warm water and a conventional wetting agent.

The plaster suspension is prepared by mixing stucco plaster or modeling plaster in water (10% by weight); the mixture is stirred for approximately 1 hour and is then ready to use. Combining the use of the separating spray with a brief temperature treatment is advantageous in order to release the body from the mold. The elevated temperature of the solution can be produced by exposure to radiant heat or warm air. For bodies from 3–5 mm thick, from 1–3 minutes of warm air at approximately 50° C. suffices for separating them from the mold.

This method can also be used when the low-pressure process is used. After the body has been formed the mold is poured out and then placed under pressure once again, using compressed air, and then heat-treated to effect release from the mold. With these provisions, the drying time of the body in the mold and hence the mold waiting time can be reduced to a few minutes. The heat treatment can be given to the body using either radiant heat or warm air. To release solid cast parts, the use of the above-mentioned separating spray is sufficient.

To produce porous mold parts for molding ceramic compositions water and water-emulsifiable, hardenable compounds are used as a water-in-oil emulsion. The pore volume is adjusted by means of the amount of water in the emulsion. The pores must be predominantly open and must be refillable with water.

For use in pressureless casting, pore volumes between 45 and 60% are preferred. The molds are not subjected to notable surface stress, and the changes that occur with plaster, such as softening and degradation of the surface because of moisture, weak acids and alkalis and polyphosphates have no influence, or only an extremely small influence, on the plastic molds.

Greater resistance to pressure and frictional wear are necessary when the molds are used as casting molds, turn molding molds and compression molding9 molds. By adjusting the emulsion to a low water content between 20 and 45%, this is readily attained. The pore volume can also be reduced, and the mechanical strength increased, by means of fillers such as microbeads of glass, barite, quartz powder and other fillers or polymers in powder form. The permeability of the mold composition to gases and liquids can be regulated thereby, in particular when wetting agents to be described below are added to the emulsion in a proportion of 0.05 to approximately 1%, with respect to the hardenable component. However, this may possibly impair body formation—which is indispensable even in turn molding, compression molding and low-pressure methods.

Depending on the composition of the molds produced in accordance with the invention and on the method used, such as pressureless casting, low-pressure casting process, turn molding and press molding, the molds produced in accordance with the invention attain a service life that is several times as long as that of plaster molds under the same conditions. For instance, turn molds still do not exhibit any changes on the surface after having been unmolded 500 times.

Compacting of the surfaces can, if desired, be obtained by applying aqueous synthetic resin solutions, for instance with melamine-carbamide-formaldehyde resins, epoxy resins or film-forming plastic dispersions.

The molds can also be thinned down in parts and combined with plaster mold parts. The mold material can be worked, glued, coated, screwed, milled and turned like wood and reinforced with conventionally known materials such as glass fibers, textile fibers and metal parts.

The method of making mold parts from water-in-oil emulsions, the oil phase of which are compounds capable of being being polymerized or hardened and of being emulsified in water, is known.

German Patent 22 56 496, columns 2–8, describes the prerequisites and the ingredients of hardenable or polymerizable water-in-oil emulsions and describes how their proportions are adjusted, as well as referring to the changes brought about in the hardened product by adjusting the degree of dispersion of an emulsion. To this end, emulsifiers that result in open-pored systems, as well as catalysts and accelerators are named, so the reader can be referred to this patent in this context, which is also reflected in other publications. The pertinent extracts from the literature will be summarized and listed hereinafter.

Although these methods were known, it had not heretofore been possible to produce a plastic material that was suitable for the molding of ceramic materials.

More intensive tests of porous material samples produced by the known method yielded results in terms of their behavior when coated with a porcelain slip that were therefore unexpected. Contrary to the idea that the hydrophobic plastics could not develop capillary any activity with respect to aqueous media, there were a few samples that, similarly to plaster, within a few minutes formed a body that could be removed after drying. Conspicuously, the capillary activity with respect to water was lower, in these samples made from the same recipe, being approximately 20% of the capillary suction of other samples, with an ascension capacity of 20 cm of a water column in 15 minutes on a profile standing upright in the water. However, these samples were not in a position to form a body. It was accordingly appropriate to assume that the capillary activity of a porous article, alone, is not decisive for body formation, but that the structure of the material also plays a role. The capacity of forming a body increased in those samples that were prepared with a higher-viscosity emulsion and that had a highly predominant proportion of open pores in the total pore volume. Therefore, to generate a suction that is effective for body formation, the emulsion must be adjusted within a dispersion range that corresponds to the desired properties, yet is capable of varying depending on the type of polymerizable or hardenable liquids and possible additives contained in the oil phase.

In order to obtain reproducible results, the simplest criterion for adjusting the degree of dispersion of the emulsion is arrived at by directly using the body formation ascertained on a hardened profile. In Examples 1 and 2 and Table 3, the results of orientation tests show how body formation varies as viscosity increases, in comparison with plaster.

This adjustment loses significance, however, if the already named additives that accelerate body formation are used. Apparently these additives are of critical significance in varying the fine texture of the material, which promotes body formation.

In order to produce the molds according to the invention, the following examples of hardenable components of the emulsion are advantageously used: Polyester resins (A) made from polybasic carbonic acids such as maleic acid, fumaric acid, itaconic acid or their anhydrides, adipic acid, sebacic acid, phthalic acid, isophthalic and terephthalic acid and multivalent alcohols such as ethylene glycol, 1,3-butylene glycol, 1,2-propylene glycol, neopentyl glycol and similar diols. The resins are dissolved in monomers (B) suitable for crosslinking or mixed polymerization. The resin in the solution is in a proportion of 40 to 70% by weight.

Examples of monomers (B) are styrene, alphamethyl styrene, phthalic acid allyl esters, esters of methacrylic and acrylic acid (the latter as a plasticizer, for instance), but in particular styrene and methacrylic acid methylester.

Examples of catalysts (C 1) used are those soluble in monomers, such as benzoyl peroxide, lauroyl peroxide, and also water-soluble peroxides, and as fast accelerators (D), dimethyl-p-toluidine and dimethyl or diethylaniline are used. As the emulsifiers (E 1), water-in-oil emulsifiers are used; for producing open-pored products, polyol emulsifiers, block polymers of polypropylene and polyethylene oxide having at least 30% of hydrophilous groups in the total molecule and from 0.5 to approximately 3% by weight of the hardenable components contained in the emulsion have proved to be particularly suitable. The water-in-oil emulsifiers can be supplemented with small quantities of detergents (E 2) or surface-active substances, such as alkylaryl sulfonates, fatty alcohol sulfates, fatty alcohol ethylene oxide addition compounds and the like, which are known in the form of commercially available washing active substances. If powdered polymers or fillers are added, then the detergents for regulating the permeability to gases and liquids can be used in small quantities of up to approximately 0.5% of the quantity of resin.

To accelerate the formation of a body (F), sodium disilicate and disodium tetraborate, which are preferred as alkaline-reactive molecular water-binding substances, have proved to be particularly suitable as compared with other, less effective compounds such as the dihydrate of calcium sulfate. However, sodium disilicate and disodium tetraborate require different quantities of additives; it is recommended that these additives be limited to approximately 2 to approximately 12% by weight, in terms of the hardenable component of the emulsion. The substances that are usable for (F) can also be used in combination with one another.

An additional increase in the permeability to liquids and gases, but also a reduction of the loss to polymerization, is effected with powdered to fine-grained, moisture-expandable polymers (G) in the hardenable or polymerizable phase. Examples are powdered polymers, such as polymerizates of unsaturated polyesters, 30 parts by weight, and 70 parts by weight of monomeric mixture of styrene and methacrylic acid methylester 1:1, or a polymethylmethacrylate (bead polymerizate with fine grain size, grain diameter approximately 0.01 to 0.2 mm and a molecular weight over 250,000, which is also used in the examples).

Tap water (H) is used as the water.

The procedure according to the invention will now be described by way of example.

To the resin (A) dissolved in the monomers (B), emulsifiers (E 1, E 2), catalyst (C) or accelerator (D) and finally the additives for (F) and (G) are added and mixed in—the order can be changed—and then the water is added, stirring slowly, and the water-in-oil emulsion is formed. Depending on the temperature and catalytic action, a solid mold part, which contains water, is obtained after approximately 15 to 120 minutes, the weight of which is reduced after drying by approximately the proportion of emulsion water, that is ±2-3%. The pore volume corresponds approximately to the amount of water incorporated into the emulsion and is predominantly open from 75-97% of the total pore volume).

TABLE 1

Specification of the Components

| | |
|---|---|
| A Resin | unsaturated polyester of maleic acid and glycols |
| B Monomers | B (1) styrene |
| | B (2) methacrylic acid methyl ester |
| C Catalyst | benzoyl peroxide, 50% strength |
| D Accelerator | n-dimethyl-p-toluidine, 10% strength |
| E Emulsifier | E (1) water-in-oil emulsifier of non-ionogenic polyether glycols |
| | E (2) commercially available wetting agents based on non-ionogenic tensides |
| F Additive for body formation | F (1) disodium tetraborate |
| | F (2) sodium disilicate |
| G Powdered polymerizate | fine-grained polymethylmethacrylate, molecular weight above 200,000, mean grain size 20 μ |
| H Water | tap water |

TABLE 2

Component Composition of the Examples
Parts = parts by weight

| Example No. | A | B1 | B2 | C | D | E1 | E2 | F1 | F2 | G | H |
|---|---|---|---|---|---|---|---|---|---|---|---|
| 1 | 52.0 | 48.0 | — | 2 | 1 | 2 | — | — | — | — | 100 |
| 2 | 52.0 | 28.0 | 20.0 | 2 | 1 | 2 | — | — | — | — | 200 |
| 3 | 52.0 | 28.0 | 20.0 | 2 | 1 | 2 | — | 3 | — | — | 100 |
| 4 | 52.0 | 28.0 | 20.0 | 2 | 1 | 2 | — | 6 | — | — | 100 |
| 5 | 52.0 | 28.0 | 20.0 | 2 | 1 | 2 | — | 8 | — | — | 100 |
| 6 | 52.0 | 28.0 | 20.0 | 2 | 1 | 2 | — | — | 7.5 | — | 100 |
| 7 | 52.0 | 28.0 | 20.0 | 2 | 1 | 2 | — | 6 | 6 | — | 100 |
| 8 | 50.0 | 25.0 | 25.0 | 2 | 1 | 2 | 0.15 | 4 | — | 75.0 | 60.0 |
| 9 | 50.0 | 25.0 | 25.0 | 2 | 1 | 2 | 0.15 | 4 | — | 50.0 | 75.0 |
| 10 | 50.0 | 25.0 | 25.0 | 2 | 1 | 2 | 0.15 | — | — | 75.0 | 60.0 |
| 11 | 50.0 | 25.0 | 25.0 | 2 | 1 | 2 | 0.15 | — | — | 50.0 | 75.0 |

EXAMPLES 1 AND 2

The water component is stirred slowly with a paddle mixer (speed 300 to 400 rpm) into the resin dissolved in the monomers, which already contains the emulsifier, accelerator or hardener in solution, and the water-in-oil emulsion is formed. The viscosity increases as a function of the intensity and length of stirring. Samples are withdrawn after 1, 2 and 5 minutes. In Example 1, the samples have a viscosity of 2500, 3700 and 4200 cP; in Example 2, the figures are 1600, 2800 and 5000 cP. After adding and mixing in the appropriate hardeners, or appropriate quantity of accelerator, the samples are poured into small platforms, which are 9 cm in diameter, to a depth of 12 mm and are cold hardened. Following drying and removal of the water of emulsion, the samples are damp-wiped, and a small amount of a porcelain slip (water content 32%) is applied onto them. The slip spreads out to a layer thickness of approximately 2 mm. In the samples, the time required until the surface became matte was determined by stop watch.

The same test was performed on a small plaster platform (RG 1.05) for comparison.

The following results were obtained.

TABLE 3

| Samples of Example 1 | | | |
|---|---|---|---|
| Stirring time in seconds | 60 | 120 | 300 |
| Viscosity in cP | 2500 | 3700 | 4200 |
| Body formation in minutes | 18 | 15 | 11 |
| Samples of Example 2 | | | |
| Stirring time in seconds | 60 | 120 | 300 |
| Viscosity in cP | 1600 | 2800 | 5000 |
| Body formation in minutes | 28 | 18 | 6.5 |
| Plaster | | | |
| Body formation in minutes: | 5.5 | | |

The body formation time is shortened with increasing viscosity. It only barely reaches the time with plaster in the case of Example 2, at 6.5 minutes. The dependency between viscosity and body formation time is clear. The range of viscosity varies with the variation in the composition of the hardenable phase of the emulsifiers. The body formation on the plastic samples is shortened by up to 20% as the slip temperature increases, at 40° to 50° C.

The simple orientation test demonstrates the behavior of the hardened samples of material in body formation and indicates under which conditions and in what range of time the body formation takes place, and in what range of emulsion viscosity the particular body formation desired is obtained.

The adjustment can be made largely reproducible via the components of the emulsion, as long as the temperature and stirring intensity are adhered to when the emulsion is prepared.

In the following examples, the formation and drying of the body are accelerated by means of additives in the emulsion. It is notable that the above-demonstrated influence of the viscosity of the emulsion on the body formation decreases markedly, in comparison with the effect obtained by adding the above-named additives. This is probably closely associated with the fineness with which the water is distributed in the emulsion, which is further increased if, as already mentioned small quantities of detergents are added. The hydrophilizing thereby produced at the same time appears to be of little significance.

In Examples 3-7, increasing amounts of additives suitable for body formation are added to the emulsion. They can be introduced along with the resin or the water, or as a hot solution (60°-70° C.) or directly into the emulsion. Care must be taken that the emulsion, which reacts to additives by increasing its viscosity, does not decompose as a result of phase change. The emulsion is poured out onto platforms, and after drying, samples are tested for body formation. A plastic tube (for instance, a PVC tube 6 cm in height and 4.5 cm in inside diameter) is placed upon each sample. The tube is insulated with Vaseline and filled up with a slip having a water content of 25-30% and at a temperature of 20° C.

After a filled waiting time of 30 and 60 minutes for the slip in the mold, or 8 and 16 minutes in the case of porcelain slip, the liquid amount is poured off. After a further 10-20 minutes, the tube part is removed; the body is further dried, then released and dried until its weight remains constant at room temperature of 20° to 25° C. A control test is performed in the same manner, using a small plaster platform of similar design. The weight of the dry body is determined and compared with the body obtained on plaster, the latter being considered equal to 100%.

In Table 4, the figures obtained for Examples 3-5are shown, supplemented with figures for the material samples 206 and 208, which were obtained by the same recipe except with a smaller amount of water in the emulsion.

The table clearly shows the considerable acceleration of body formation, which is also applicable to all ceramic materials. The body formation time varies depending on the type of ceramic material, as is already known for molding with plaster.

The solidification of the bodies also takes less time than with plaster, in particular with body thicknesses of 6 to 8 mm, for example, or after several successive unmoldings. The porous plastic mold removes up to 30% more water from the body as compared with plaster. The almost double pore volume that is available in the mold, as compared with plaster, can be fully exploited.

markedly increased. Filter plates of the same thickness and the same amount of exposed surface area, produced in this way, exhibit twice the passage speed, for the same quantities of water at the same pressure. If the amount of wetting agent added is increased further, then the permeability can rise up to 10-fold; the body formation is equal to zero; the suction capacity is superior only for water (ascension capacity of the water in 15 minutes is 15 cm); use for the method according to the invention is no longer possible. Such products can be used for die casting when high pressures of 10 to 50 bar are applied Thus the applicability of the invention in contrast to known methods is clearly defined.

Possible materials for the apparatuses used to produce the porous plastic working molds are metals such as aluminum, zinc, low-melting alloys (melting point between 120° and 200° C.), which may for instance also be used for make molds in injection molding, and steel, but not nonferrous metals, as well as such plastics as polypropylene, polyethylene, epoxy resins and polyurethane casting resins.

TABLE 4

| Slip: | Bathroom-fixture ceramic | | | | Fine fireclay | | | | Fireclay | | | | Porcelain | | | |
|---|---|---|---|---|---|---|---|---|---|---|---|---|---|---|---|---|
| Dwell time: | 30' | | 60' | | 30' | | 60' | | 30' | | 60' | | 8' | | 16' | |
| Dry weight | g | % | g | % | g | % | g | % | g | % | g | % | g | % | g | % |
| Plaster | 22.1 = | 100% | 29.4 = | 100% | 18.9 = | 100% | 24.0 = | 100% | 22.5 + | 100% | 28.5 = | 100% | 10.3 + | 100% | 12.6 = | 100% |
| 206 | | | 23.2 | −21.1 | 15.8 | −16.4 | 21.8 | −9.1 | | | 23.3 | −18.0 | | | | |
| 208 | 22.2 | ±0 | 28.8 | −2.0 | | | | | | | | | | | | |
| 304 | 23.9 | +8.1 | 33.6 | +14.3 | 18.7 | −1.0 | 26.1 | +8.7 | 23.8 | +5.7 | 24.6 | −13.6 | 12.6 | +22.3 | 21.23 | +36.3 |
| 306 | 27.6 | +24.8 | 36.9 | +25.9 | 22.0 | +5.8 | 28.0 | +16.6 | | | 29.2 | +2.4 | 14.8 | +44.0 | 20.0 | +58.7 |
| 308 | 27.9 | +26.2 | 39.5 | +34.4 | 20.0 | +16.4 | 30.8 | +28.3 | 27.4 | +21.3 | 38.5 | ±0 | | | | |

The plastic samples used for comparison contained the following proportions of hardenable component in the emulsion used for preparation, in terms of 100 parts by weight:

| Sample | Parts by weight of water | Parts by weight of body formation accelerator |
|---|---|---|
| 206 | 50 | 6 |
| 208 | 50 | 8 |
| 304 | 100 | 3 |
| 306 | 100 | 6 |
| 308 | 100 | 8 |

The release of the body is delayed. The instant of release can be regulated, however, by brief heating at temperatures above 50° C. If the plastic mold is treated with plaster spray as mentioned above, then the plaster and plastic molds both release the body at the same time.

With the above experimental arrangement, up to 375 unmoldings were performed with one and the same plastic mold, without perceptible changes on the surface of the mold or of the body or in the function. In these texts, from 15 to 16 unmoldings were performed in succession at the same location without interruption and with mold drying.

The formation of a body can also be accelerated by elevating the temperature of the slip; this is known per se, however. While increasing the temperature rapidly causes damage to the mold in the case of the plaster mold, the temperature of the slip can be raised without reservations to over 60° C., if desired, in the case of the plastic mold.

Experiments 8, 9, 10 and 11 are performed with the addition of a bead polymerizate with and without using wetting agents. The proportion of water and hence the pore volume is thereby reduced, and the mechanical strength is increased. Body formation decreases by approximately half. The permeability to gases and water is In the following example, a recipe from Table 2 is used to manufacture casting molds. In the list found in Table 4, for a bathroom-fixture ceramic composition, a favorable body formation in 30 minutes for material 306 is ascertained, which corresponds to Table 2, Example 4 with 50% water and 6% body formation accelerator According to this recipe, a casting mold having a mold wall thickness of 3.5 cm is manufactured using an apparatus for a 0.5-liter pitcher. With this mold, the following comparison tests as compared with a plaster mold are performed. The following data were ascertained:

| Casting mold | Plaster | Plastic |
|---|---|---|
| Mold weight | 3.8 kg | 1.2 kg |
| Mold wall thickness | 6 cm | 3.5 cm |
| Type of slip | stoneware | stoneware |
| Liter weight | 1.82 | 1.82 |
| Slip temperature | 26° C. | 26° C. |
| Filled waiting time | 75 min | 15 min |
| Drying time in the mold | 120 min | 30 min |
| Drying temperature | 35° C. | 25° C. |
| Body thickness | 5-6 mm | 6 mm |
| Cycling time | 195 min | 45 min |
| Pours per day | 2 | 6-8 |

The cycling time is shortened by 77% in the novel method, as compared with plaster. Similiar results can also be attained with larger molds, such as those in the area of bathroom fixtures, and with other types of slip, taking the thereby-dictated prolongation or shortening of body formation time, such as with porcelain, into consideration. In addition to the difference in weight, which plays a particularly important role in transporting and storing the mold, entirely new perspectives are gained in terms of manufacturing considerations because multiple unmoldings per day are possible, and because of the longer service life of the mold.

With the low-pressure method according to the invention, a considerable expansion of ceramic molding technology is attained.

Figure 2:
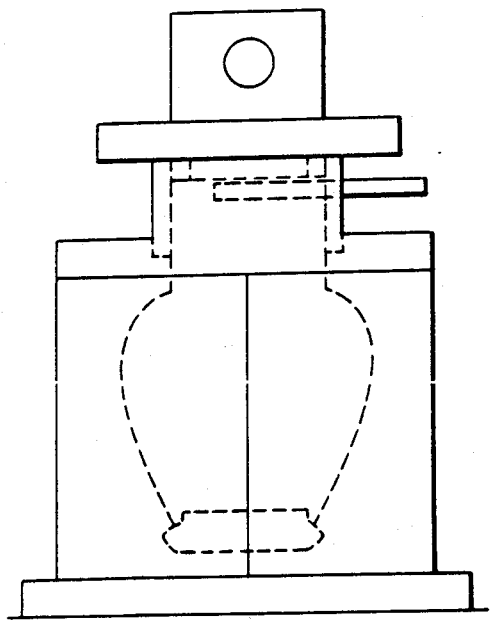

The above-mentioned three-part casting form (bottom and two side parts) is secured with two lashing straps surrounding the body of the casting mold, in order to perform the following experimental example. A fill pipe is mounted on the inlet, together with the rim of the inlet tightly closing the mold; in this test, the fill pipe communicates with a compressed-air line. See FIG. 2. The form is filled with slip, and the fill pipe is sealed off with pressure, using a small hydraulic press. Compressed air at 1 bar is supplied to the mold for 6 minutes. After 6 minutes, the compressed air is evacuated and the mold is opened; the slip is poured out (naturally it can be aspirated instead, by inserting a suction tube into the mold), and the form is again put under pressure using 2 to 3 bar compressed air; finally, the closed or opened mold is flushed with warm air at 50° C. for 2–3 minutes. After this, unmolding can be performed, and molding can begin anew. The molding cycle is thus reduced to 12 to 15 minutes. The additional application of pressure partially replaces the suction capacity of the mold. It is thus possible to perform a virtually arbitrary number of cycles in succession, without taking the pore volume into consideration. Since on the one hand the surface of the mold is not stressed greatly, because of the low pressure applied, and since on the other hand mold compositions having a low pore volume can also be used, because of the contribution of the pressure, the service life of the mold is impressive. Depending on the kind of slip, from 300 to several thousand unmoldings can be performed. The low application of pressure has still other advantages, however. The outfitting of the mold is virtually indistinguishable from a normal casting form. The expense for machinery is reduced to a minimum. The procedure can be performed equally well in manual operation or with a small automatic system. With a small rotary machine, a daily output of up to 200 blanks can be attained, under the above-described conditions, using 6 casting molds.

The most important features of the invention for the molding of ceramic materials will now be summarized briefly, as follows:

1. For molding the ceramic materials, working forms for performing conventional processes such as casting, with and without pressure, as solid or hollow casting or combinations of the two, turn molding and compression molding of bathroom fixtures, dishware, ornamental, structural and technical ceramics are used, which are produced using a hardenable emulsion comprising water and water-emulsifiable compounds. The mold parts obtained in this way have a predominantly open pore volume, which can be refilled with water and by the following provisions becomes capable of forming a body when in contact with ceramic compositions:

(a) by adjusting the degree of dispersion of the emulsion;

(b) by means of additives which serve to accelerate and regulate body formation; and (c) by adjusting the pore volume by means of the water content in the emulsion.

The provisions listed as (a) and (b) can each be used alone or they can be used in combination. Provision (c) should be adapted to the intended purpose. As a minimum, the open pore volume should not be less than 10% of the total volume of the molding composition, while the upper limit of the total pore volume is approximately 60%.

2. The method also applies to provisions for considerably shortening the mold waiting time, while largely protecting the mold, (a) by using a low-pressure method, in which a low pressure of up to approximately 3 bar is exerted on the slip, in the mold for the sake of body formation, until the desired body thickness has been attained;

(b) by exerting9 brief compressed-air pressure upon the now-formed body, up to approximately 5 bar, after the removal of the liquid component of the slip, in order to accelerate drying;

(c) by simultaneous, or subsequent, brief treatment with blown-in warm air, or by radiant heat, of the now-formed body until it separates from the mold.

These provisions can each be used alone or in combination in producing hollow cast parts, in order to shorten the mold waiting time.

3. The release of the now-formed body from the mold is (a) shortened in time by treatment of the surface of the mold with a spray, which contains cemented plaster in suspension or plaster in the form of a dry powder; and (b) additionally accelerated by briefly heating the body formed in the hollow casting.

The advantages of molding ceramic materials in accordance with the invention are as follows:

The weight of the working molds is reduced to from 70 to 25% of that of the same mold made of plaster. The mold material can be worked similarly to wood and thus offers novel possibilities and particular simplifications in constructing and designing the molds.

The mold wall thicknesses should uniformly and generally be about half the thicknesses that are typical for plaster molds, and the mass of the mold is thus decreased.

The filled waiting time and drying time of the body in the mold, in casting according to the method of the invention, amount to a fraction of the time normally required. The number of daily unmoldings are multiplied, especially if the low-pressure die casting method described is employed and if multiple molds or batteries of molds are used.

With the increased service life of the molds used for casting and turn molding, considerable economies of material, space and other expenditures are attained.

I claim:

1. A method for shaping a ceramic article by any of various ceramic shaping procedures which comprises the steps of (1) preparing a mold comprising a shaped porous, open-pore, hardened, plastic composition, said mold having been prepared from said composition by forming said composition from a water-in-oil emulsion comprising an aqueous phase dispersed in a continuous oil phase comprising (a) at least one unsaturated polyester resin dissolved in at least one hardenable compound containing at least one ethylenically unsaturated group and ((b) at least one emulsifying agent; incorporating in said water-in-oil emulsion about 2-12% by weight of said hardenable compound of a material effective in accelerating the formation of said ceramic article to be shaped in said mold, said material being selected from the group consisting of sodium disilicate a tetraborate; controlling the ratio of said aqueous phase to said oil phase of said emulsion so that said porous, open-pore, hardened, plastic composition has an open-pore volume, which is refillable with water, of about 10-60% of the total volume of said porous, open-pore, hardened, plastic composition; placing said water-in-oil emulsion into the desired mold shape; subjecting said hardenable compound of said continuous oil phase to hardening without breaking said water-in-oil emulsion of said composition, and then drying said shaped water-in-oil emulsion to thereby obtain said mold of said shaped, porous, open-pore, hardened, plastic composition; (2) withdrawing water from said ceramic slip or ceramic plastic mass through said open pores of said mold to shape said ceramic article; (4) removing residual ceramic slip or ceramic plastic mass from said mold; (5) drying said resultant shaped ceramic article while in said mold; and (6) separating said dried ceramic article from said mold.

2. A method according to claim 1 in which said ceramic slip or ceramic plastic mass is subjected while in said mold to a pressure no greater than about 3 bar.

3. A method according to claim 1 in which said shaped ceramic article is subjected to compressed air at no greater than about 5 bar to accelerate said drying, and then, optionally, heated to s said shaped ceramic article from said mold.

4. A method according to claim 1 in which said separation of said dried ceramic article from said mold is facilitated by spraying the surface of said mold, before introduction of said ceramic slip or ceramic plastic mass into such mold, with plaster in the form of a dry powder or a 1-10% aqueous suspension.

* * * * *